INVENTOR.
PAUL GRÖNERT

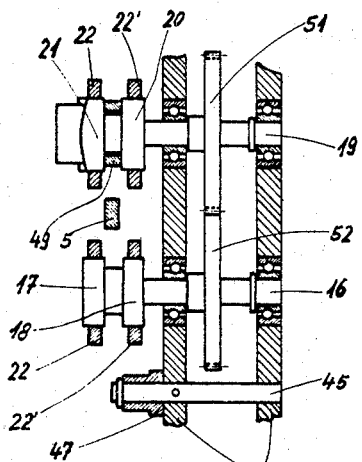
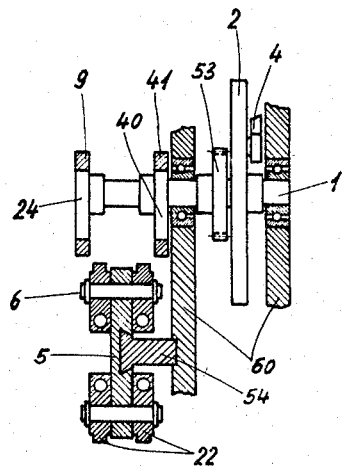
Fig. 3
Fig. 4
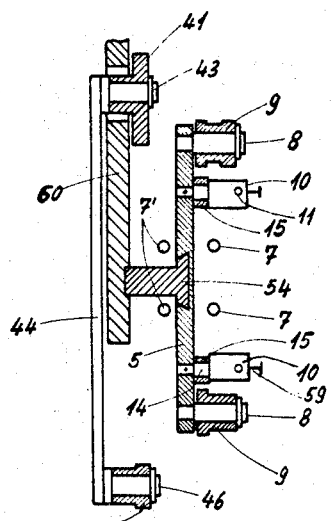
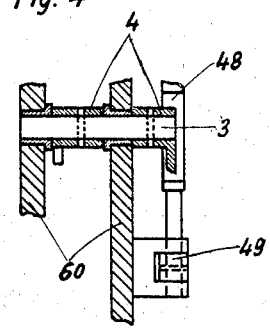
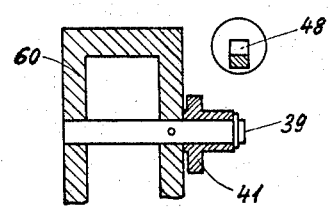
Fig. 6
Fig. 5
Fig. 7

April 23, 1968        P. GRÖNERT        3,378,899

THREAD SELECTING MECHANISM FOR WARP TYING MACHINES

Filed July 21, 1966        6 Sheets-Sheet 3

INVENTOR.
PAUL GRÖNERT
BY
Lowry & Rinehart
ATTYS.

April 23, 1968 P. GRÖNERT 3,378,899
THREAD SELECTING MECHANISM FOR WARP TYING MACHINES
Filed July 21, 1966 6 Sheets-Sheet 5

INVENTOR.
PAUL GRÖNERT
BY Lowry & Rinehart
ATTYS.

INVENTOR.
PAUL GRÖNERT
BY
Lowry & Rinehart
ATTYS.

United States Patent Office 3,378,899
Patented Apr. 23, 1968

3,378,899
THREAD SELECTING MECHANISM FOR
WARP TYING MACHINES
Paul Grönert, Friedberg, near Augsburg, Bavaria, Germany, assignor to Knotex Maschinenbau G.m.b.H., Augsburg, Postfach, Germany
Continuation-in-part of application Ser. No. 199,038, May 31, 1962. This application July 21, 1966, Ser. No. 566,949
10 Claims. (Cl. 28—49)

This is a continuation-in-part of my copending application, Ser. No. 199,038, filed May 31, 1962, now abandoned, for Warp Tying Machine.

The invention relates to a novel thread selecting mechanism for warp tying machines, and is particularly directed to a thread selecting machanism which is operative to select threads for four different types of knots which may selectively be applied during warp-tying operations.

In conventional thread selecting mechanisms for warp tying machines a change in thread selection for changing from one knotting mode to another requires some machine components to be rendered inoperative and others are put into operation by complex shifting mechanisms requiring difficult and time-consuming manipulations. Warp tying machines of conventional construction generally require added or auxiliary shifting mechanisms, added drive elements, and additional room to house such generally cumbersome added equipment.

In keeping with the foregoing it is a primary object of this invention to provide a novel thread selecting mechanism for warp tying machines which overcomes the above and numerous other disadvantages of conventional thread selecting mechanisms, and includes a plurality of brushlike thread holders capable of being swung between and locked at two positions, and means for interlocking the brush holders in either of the two positions depending upon the particular knotting mode being performed by the warp tying machine.

A further object of this invention is to provide a novel thread selecting mechanism of the type heretofore described wherein a brush holder and a thread pusher are pivotally carried by a brush lever, and a pusher and its associated brush lever define in part a parallelogram linkage which at all times maintains the pushers in their vertical operative positions.

Still another object of this invention is to provide a novel thread selecting mechanism of the type just described including thread guides and a thread separating needle, the pushers being disposed between and cooperative with the separating holder and the brush, and each pusher being positioned between adjacent spaced thread guides thereby imparting an undulating configuration to a thread positioned between the latter-noted components during the operation of the thread selecting mechanism.

In accordance with this invention, if knots are to be tied with the old and new warps interlaced, both brushes of the thread selecting mechanism are swung toward and locked in a forward operating position. When the warps are not interlaced both brushes are swung backward and locked in a neutral non-operative position. In accordance with a third mode of operation the mechanism, with the new (lower) warp in the crossing and the old (upper) warp without crossing, the lower brush is swung forward and the upper brush is swung rearward. Finally, with the new warp without crossing and the old warp in the crossing the lower brush is swung backward and the upper brush forward. Thus, each of the latter-noted four positions of thread selection are readily effected by this invention by the mere manipulation of a lever or the push of a button, and in all cases the change is carried out without affecting the machine drive because of the coupling thereof to the brush levers.

A further object of this invention is to provide a novel lifter mechanism forming a part of the thread selecting mechanism, the lifter mechanism having connected therewith thread pushers, cross tubes and needle stops whereby separate drives formerly necessary for operating the latter-noted components are eliminated and machine complexity is correspondingly reduced.

These and other objects of the invention are attained by the construction and arrangements shown by way of illustration in the accompanying drawings forming a part hereof, in which:

FIG. 3 is a sectional view taken along line I—I of FIG. 1, and illustrates rotatable cams for imparting up and down pivoting movement to crossheads of the thread selecting mechanism;

FIG. 4 is a sectional view taken along line II—II of FIG. 1, and illustrates rotatable cams for imparting pivotable movement to the brush levers and the brush holders carried thereby;

FIG. 5 is a sectional view taken along line III—III of FIG. 1, and illustrates a clutch mechanism of the invention;

FIG. 6 is a sectional view taken along line IV—IV of FIG. 1, and illustrates the pivotal mounting of the brush levers and thread separating needles;

FIG. 7 is a sectional view taken along line V—V of FIG. 1, and illustrates the pivotal mounting of the upper needle lever to a side frame of the mechanism;

Figure 1:
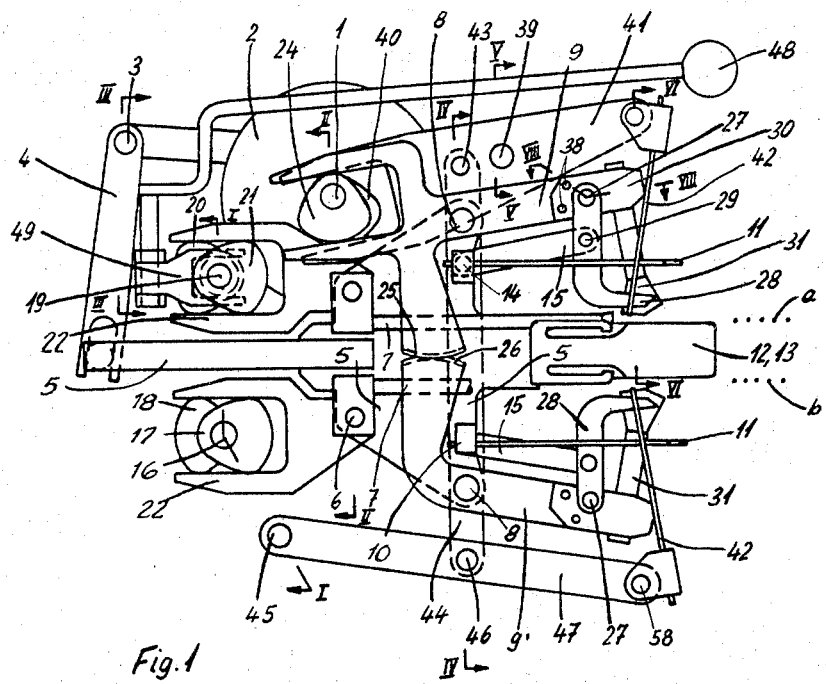
FIG. 1 is a side elevational view of the thread selecting mechanism of this invention, and illustrates a pair of brush levers carrying brush holders, and a parallelogram linkage defined in part by each brush lever.

The thread selecting mechanism of this invention is best illustrated in FIG. 1 and includes a frame 60 (FIG. 3) which is formed of a plurality of individually unnumbered frame elements. The primary drive for the thread selecting mechanism is through a gear 51 (FIG. 3) fixed to a shaft 19 which is in turn conventionally journaled for rotation in upstanding frame elements (unnumbered) of the frame 60. The gear 51 is driven by a drive gear (not shown) in mesh therewith. A gear 52 (FIG. 3) is in mesh with the gear 51 and is fixed to a shaft 16 (FIGS. 1 and 3) which is journaled to the frame 60 in the manner clearly illustrated in FIG. 3 of the drawings. Another gear 53 (FIG. 4) fixed to a shaft 1 is also in mesh with the gear 51. Thus, motion imparted to the gear 51 rotates both the gear 52, the gear 53, and the shafts 19, 16 and 1 associated therewith to impart desired movement to various components of the mechanism as will be hereinafter more fully understood.

Figure 2:
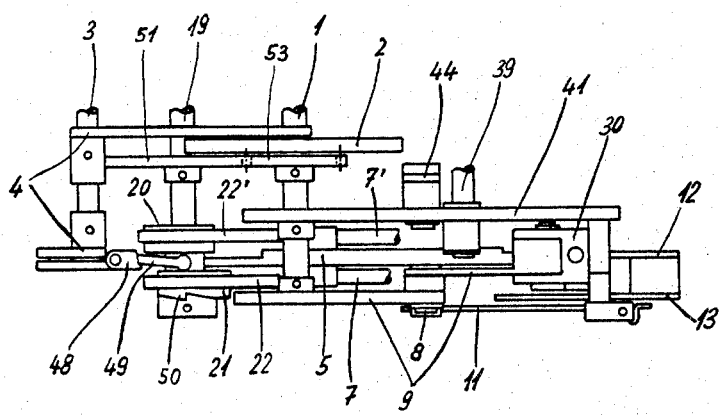
FIG. 2 is a top view of the mechanism of FIG. 1, and more clearly illustrates the several components thereof including a lifting mechanism carrying thread pushers, crossbars, and thread guides.

The rotatable cam 2 (FIGS. 1, 2 and 4) drives a terminally bifurcated lever 4 by means of an arm 4a pivotally connected to the cam 2 and a pivot connection 3 between the arm 4a and the lever 4. The movement thus imported to the lever 4 reciprocates a lifter or lifter mechanism 5 which is guided during its reciprocal movement by a dovetail-channel guide 54 (FIG. 4) in accordance with the machine cycle.

Figure 8:
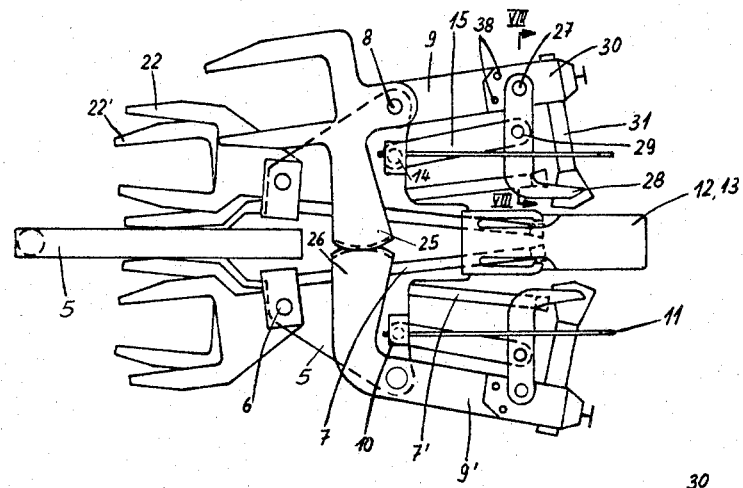
FIG. 8 is a side elevational view of the lifter mechanism and illustrates the various components carried thereby.
Figure 10:
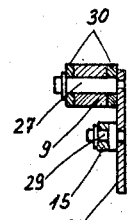
FIG. 10 is a sectional view taken along line VIII—VIII of FIG. 8, and illustrates the pivotal connection of the upper pusher with the brush lever and a connecting strap which are three components of the parallelogram linkage.
Figure 9:
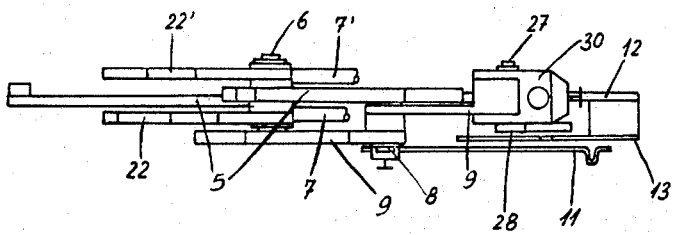
FIG. 9 is a top plan view of the lifter mechanism of FIG. 8 and more clearly illustrates the various components thereof.

The lifter 5 is best illustrated in FIG. 8 of the drawings and carried thereby are crossheads 7, 7' pivotally mounted on shafts 6, brush levers 9, 9' pivotally mounted on shafts 8, needle stops 11 which are longitudinally adjustable in bearings 10, a pair of thread guides 12, 13 (FIG. 9), and straps or links 15 pivotally mounted on shafts 14.

Figure 20:
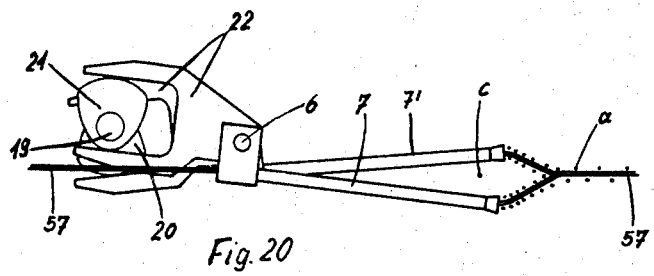
FIG. 20 is a side elevational view of a pair of the crossheads of the thread separating mechanism, and illustrates the positions thereof when operating upon a warp sheet with lease.
Figures 24, 25:
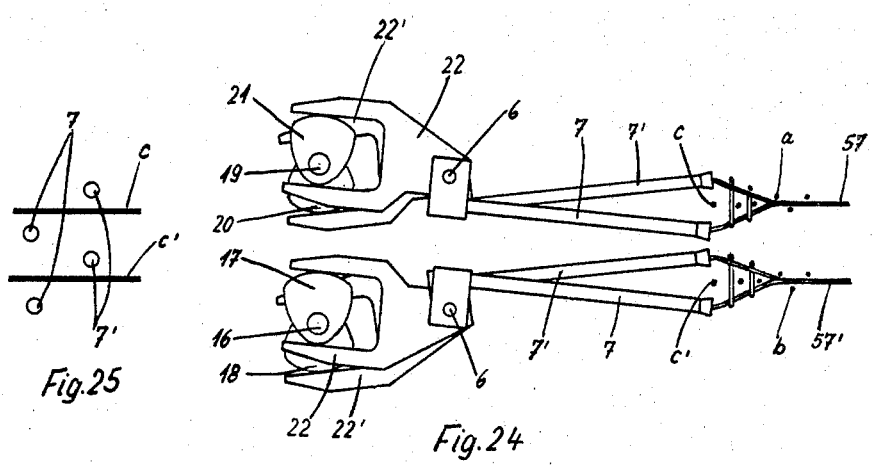
FIG. 24 is a side elevational view of the crossheads of FIGS. 20–22, and illustrates the positions thereof after the lease change.
FIG. 25 is an end view of the crossheads of FIG. 24, and illustrates the relationship of the crossheads to the threads of the warp sheet after the lease change.

Conventional upward and downward crossing movement is imparted to the lower pair of crossheads 7, 7' (FIG. 1) by cams 17, 18 (FIGS. 1, 3, 22 and 24) mounted on a shaft 16 which is in turn journaled for rotation in a conventional manner in the frame 60 (FIG. 3). Similar movement is imparted to the lower pair of crossheads 7, 7' (FIGS. 20, 21 and 24) by cams 20, 21 (FIG. 3) slidably adjustable on a shaft 19 which is mounted for rotation in the frame 60.

The cams 17, 18, 20 and 21 are in contact with forked portions 22, 22' to which the crossheads 7, 7' are fixedly connected by brackets 6a through which project the shafts 6. The cams 17, 18 and 20, 21, respectively are offset 180 degrees relative to each other thereby imparting crossing or scissor-like movement to each of the upper and lower crossheads.

In addition to the pivoting or scissor-like movement of the crossheads 7, 7', the latter are also movable toward and away from threads of an upper (old) warp $a$ and a lower (new) warp $b$, in a manner dependent upon the particular mode of operation of the thread selecting mechanism. For example, when typing warp sheet out of lease the crossheads 7, 7', after their scissor-like movement, move toward the warps $a$, $b$ by the movement of the lifter 5 during the counterclockwise stroke of the lever 4 as viewed in FIG. 1 of the drawings. During this movement the crossheads 7, 7' push the threads $a$, $b$ lying on lease cords 57, 57' away from foremost threads $c$, $c'$, in the manner clearly illustrated in FIG. 22 of the drawings.

Figure 21:
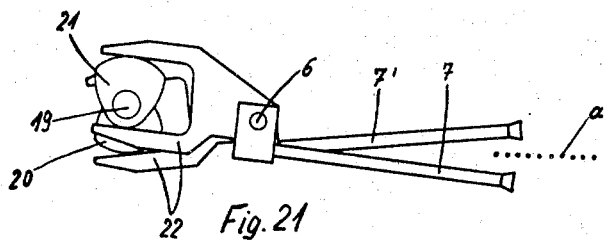
FIG. 21 is a side elevational view of the crossheads of FIG. 20, and illustrates the positions thereof when operating upon a warp sheet without lease.

When the mechanism is operating without lease i.e., in the absence of the lease cords 57, 57', the crossheads 7, 7' move above and beneath the warps $a$, $b$, in the manner shown in FIG. 21 of the drawings which illustrates only the upper warp $a$ and its relationship to the upper crossheads 7, 7'. The lower crossheads move in the same manner relative to the lower warp $b$ (not shown).

Figures 22, 23:
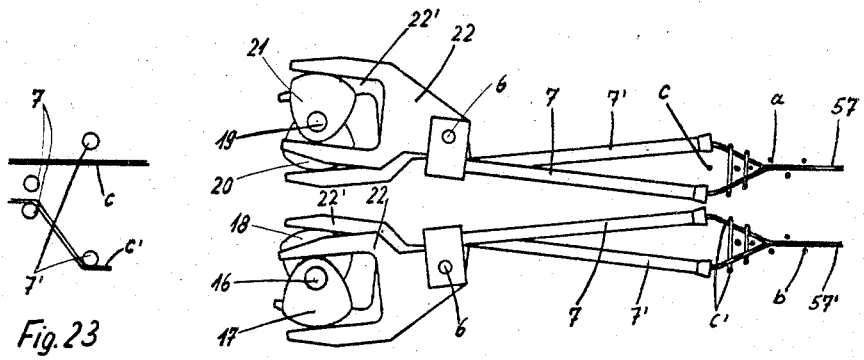
FIG. 22 is a side elevational view of the crossheads of FIGS. 20 and 21, and illustrates the positions of the crossheads before a lease change.
FIG. 23 is an end view of the crossheads of FIG. 22, and illustrates the relationship of the crossheads to the threads of the warp sheet prior to the lease change.

When the mechanism is operating in the out-of-lease mode and due to a fault in the warp sheet such that only the upper foremost thread $c$ is released and the lower foremost thread $c'$ is retained on the lease cord 57', a change of crossheads must be effected. This condition is illustrated in FIGS. 22 and 23, and is corrected by means of a coupling lever 48 (FIGS. 1 and 2) and a coupling 49 (FIGS. 5 and 7) without stopping the machine. The coupling 49 is a bifurcated member positioned between the cams 20, 21 (FIGS. 2 and 3) which are, as was heretofore described, shiftably mounted on the shaft 19. A reduced portion (unnumbered) of the coupling 49 is fixed to a vertical stem portion 48a of the coupling lever 48. The stem portion is pivotally mounted in a bearing 49a (FIG. 5) fixed to the frame 60. Thus, by swinging the lever 48 in a generally horizontal plane the coupling 49 is pivoted about the generally vertical axis of the stem portion 48a to shift the coupling 49 and therewith the cams 20, 21 along the shaft 19. When the coupling 49 is shifted to momentarily disengage the cams 20, 21 and the forked portions 22, 22' of the upper pair of crossheads 7, 7' the latter crossheads are stopped during half a revolution of the shaft 19 and the upper crossheads have changed their swinging direction relative to the lower cross-heads in the manner clearly illustrated in FIGS. 24 and 25. The reengagement of the cams 20, 21 and the forked portions 22, 22' of the upper crossheads 7, 7' is effected by manually shifting the lever 48 after the half revolution of movement of the cams 20, 21 heretofore noted, but it is to be understood that automatic means can be employed to suitably accomplish this function. For example, the cam 21 may be provided with a peripheral cam follower 50 (FIGS. 2 and 3) cooperative with a cam (not shown) secured to the frame 60 whereby the cam acts against the cam follower 50 to shift the latter and the cams 20, 21 to their operative positions after 180 degrees of revolution of the shaft 19 as measured from the disengagement of the cams 20, 21 and the forked portions 22, 22'.

Figure 26:
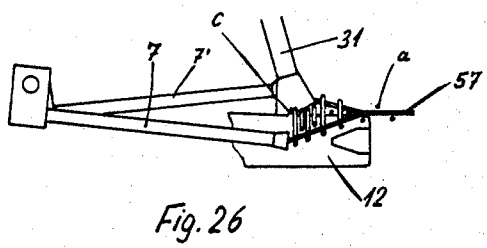
FIG. 26 is a side elevational view of a portion of the thread selecting mechanism of FIG. 1, and illustrates the upper brush thread holder in its operative forward positions.

The brush levers 9, 9' carry thread brushes 31 which come into operation when tying out of lease (with lease) after the forward movement of the crossheads 7, 7'. The function of the brushes 31 is to separate extremely hairy or sized threads by a swinging or wiping motion during the time the lifter mechanism changes its direction and is drawn back (rearward) by the lever 4. As the lifter 5 is drawn back the brushes 31 strip slightly across the warp threads and separate the foremost threads $c$ (FIG. 26) from neighboring threads to which they may still cling. The operation of the brushes 31 is effected through the brush levers 9, 9' by means of a cam 24 mounted on the shaft 1. The cam 24 engages a bifurcated or forked portion 24a of the brush lever 9 and the motion of the latter is transmitted to the lower brush lever 9' by meshed arcuate toothed segments or racks 25, 26 (FIGS. 1 and 8).

Figure 11:
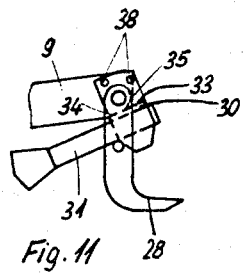
FIG. 11 is a fragmentary side elevational view of a portion of the thread selecting mechanism of FIG. 1, and illustrates the brush holder in the background or neutral position thereof.
Figure 12:
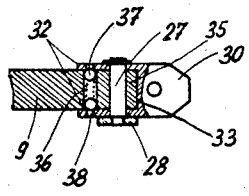
FIG. 12 is a sectional view taken through the brush holder of FIG. 11, and illustrates means for locking the brush holder in its neutral position.

Since the brushes 31 are not at all times operative, depending upon the particular mode of operation of the thread selecting mechanism, means are provided to maintain the brushes 31 fixed in both their operative and neutral positions. As is best illustrated in FIGS. 1, 2, 8, 11 and 12, the brush levers 9, 9' are provided with forked brush holders 30 at their foremost ends. Each brush lever 9, 9' is positioned between a forked end 32 of its associated holder 30 and is pivotally secured thereto by a pivot pin 27 (FIGS. 11 and 12). The forked ends 32 are provided with aligned apertures or holes 38 (FIG. 12) which retain locking balls 37 spring biased into seating engagement with the holes 38 by a spring 36. As is best illustrated in FIG. 11, there are two pairs of holes 38 in each holder 30. In the inoperative or neutral position (FIG. 11) of the holders 30 balls 37 are engaged with one set of the holes 38 while in the operative position (FIGS. 1, 8 and 12) the balls 37 are engaged with the remaining set of holes 38. Since the balls 37 might be inadvertently disengaged from the holes 38, the brush levers 9, 9' are provided with stop surfaces 34, 35 which contact a stop surface 33 of the brush holders 30. In the inoperative or neutral position (FIG. 11) of the brushes 31 the stop surface 33 of the holder 30 abuttingly contacts the surface 34 of the levers 9, 9' while in the operative position (FIG. 12) the stop surface 33 of each brush holder contacts an associated surface 35 of the levers 9, 9', thus preventing disengagement of the balls and holes and precluding faulty operation of the mechanism.

During the operation of the thread selecting mechanism it is also highly desirable to tension the warp threads c and this is achieved by selective timed up and down motion of the thread pushers 28. The connecting links (straps 15 and brush levers 9, 9') pivoted to the shafts 29, 14 and to the shafts 8, 27 form a four-bar parallelogram linkage which effects parallel guiding motion to the pushers 28 and maintains the latter in vertical position while they move up and down.

Figure 13:
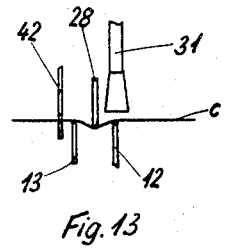
FIG. 13 is a highly schematic end view of the thread guides, separating needle, pusher, and brush holder, and illustrates the operative position of these components in relation to an old (upper) warp.
Figure 14:
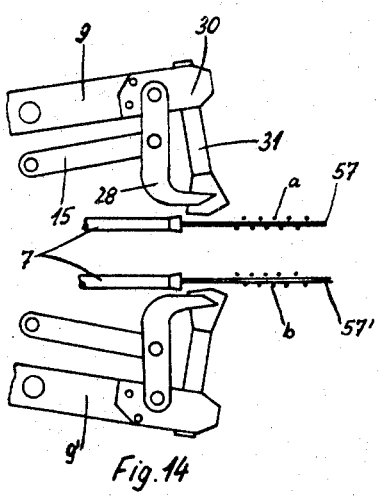
FIGS. 14 through 17 are fragmentary side elevational views of the brush holders and pushers of the thread selecting mechanism, and illustrate each of the four positions of the brush holders.
Figure 15:
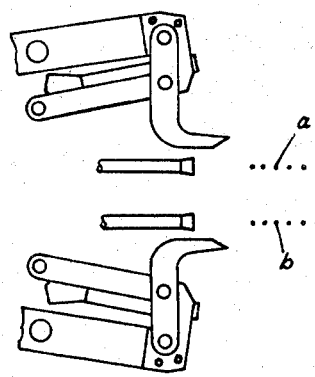
Figure 16:
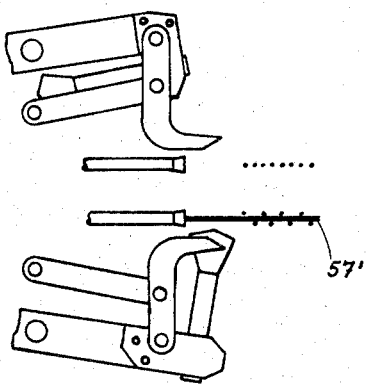
Figure 17:
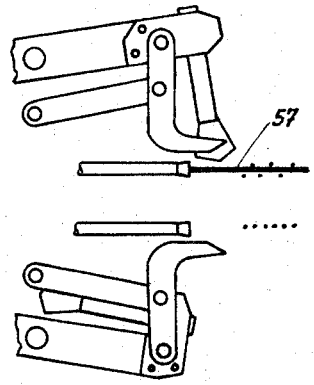
Figure 18:
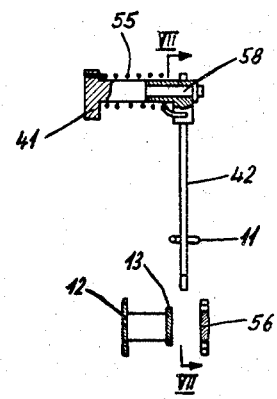
FIG. 18 is a sectional view taken along line VI—VI of FIG. 1, and illustrates the pivotal mounting of the upper thread separating needle to the upper needle lever.
Figure 19:
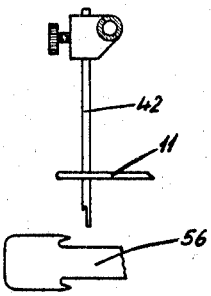
FIG. 19 is a sectional view taken along line VII—VII of FIG. 18, and illustrates a needle stop associated with the separating needle.

Separating needles 42 (FIGS. 1, 18 and 19) are provided for separating the foremost threads c from the remaining threads of the warps when under the tension of the pushers 28 (FIG. 13). Consequently, the pushers 28 move upward and simultaneously thread or yarn grabbers 56 (FIGS. 18 and 19) grasp the separated threads and carry them toward the tying mechanism (not shown). Since the grabbers 56 form no part of this invention, no further description thereof is deemed necessary. An upper needle lever 41 carrying an associated needle 42 is pivotally mounted on a shaft 39 (FIGS. 1 and 7) to which is secured a cam 40 fixed to the shaft 1. A connecting rod 44 is hinged to the needle lever 41 at 43 (FIG. 1) and is also pivoted to a lower needle lever 47 at 46. The lower needle lever 47 is pivoted at one end to a shaft 45 rotatably journaled in the frame 60, and at an opposite end to a pivot pin 58 to which the lower needle 42 is articulately mounted. The separating needles 42 are therefore the only components of the thread selector mechanism which are not reciprocated by the lifter mechanism 5 and merely perform an up and down motion as well as a swivelling motion about the pivot pins 58. The needles 42 are therefore always in their operating position whether tying out of lease or without lease and cooperate with the thread guide 13 (FIG. 13) while the brushes 31 are in operating position only when tying out of lease in cooperation with the thread guide 12. The separating needles 42 also lie loosely against the needle stops 11 (FIGS. 1, 18 and 19) and cooperate therewith in a conventional manner, it being noted, however, that the stops 11 can be fixed in any position of longitudinal adjustment relative to their mounts 16 by screws 59.

From the foregoing it will be readily apparent that by the construction and arrangement described there has been provided a thread selecting mechanism which is simple in operation, avoids heretofore necessary cumbersome auxiliary driving elements, and effects four different modes of operation in an automatic manner without machine shut-down.

What is claimed is:

1. A thread selecting mechanism for a warp tying machine comprising a lifting mechanism adapted for movement toward and away from warp threads, means for reciprocating said lifting mechanism between first and second terminal positions respectively adjacent to and remote from the wrap threads, brush levers pivotally carried by said lifting mechanism, brush holders pivotally carried by said brush levers and adapted for carrying means to wipe across and separate particular ones of the warp threads, means maintaining said brush holders in operative and inoperative positions thereof when it is respectively desired to separate or not to separate said ones of the warp threads, pushers pivotally carried by said brush levers, adapted to tension others of the warp threads, and said brush levers and pushers in part defining a parallelogram linkage for maintaining said pushers in a generally horizontal plane while effecting up and down movement thereof.

2. The thread selecting mechanism as defined in claim 1 wherein cam means are provided for pivoting said brush levers.

3. The thread selecting mechanism as defined in claim 1 including cam means for pivoting said pushers.

4. The thread selecting mechanism as defined in claim 1 including crossheads pivotally carried by said lifting mechanism, means for pivoting said crossheads, and means for at least temporarily deactivating said pivoting means to prevent pivoting movement of said crossheads.

5. The thread selecting mechanism as defined in claim 1 wherein cam means are provided for pivoting said brush levers, and cam means are also provided for pivoting said pushers.

6. The thread selecting mechanism as defined in claim 1 wherein said brush levers are disposed in cooperative pairs one above the other, means are provided for pivoting one of said brush levers, and means for transferring pivotal movement from said one brush lever to the other of said brush levers.

7. The thread selecting mechanism as defined in claim 1 wherein said pushers are disposed in cooperative pairs one above the other, means are provided for pivoting one of said pushers, and means for transferring pivotal movement from said one pusher to the other of said pushers.

8. The thread selecting mechanism as defined in claim 1 including crossheads pivotally carried by said lifting mechanism, means for pivoting said crossheads, needle levers, means for pivoting said needle levers, and a needle carried by each needle lever.

9. The thread selecting mechanism as defined in claim 1 including thread guides carried by said lifting mechanism, a needle carried by said lifting mechanism, a brush carried by one of said brush holders being in generally coplanar relationship to one of said thread guides, and one of said pushers being disposed offset from and generally between said one thread guide and another thread guide.

10. The thread selecting mechanism as defined in claim 1 including crossheads pivotally carried by said lifting mechanisms, means for pivoting said crossheads, means for pivoting said brush levers, means for pivoting said pushers, a needle lever pivotally carried by said lifting mechanism, and means for pivoting said needle lever.

References Cited

UNITED STATES PATENTS

| 1,779,312 | 10/1930 | Hammer | 28—49 |
| 2,690,606 | 10/1954 | Fleischer | 28—43 |
| 2,175,277 | 10/1939 | Noling | 28—43 |
| 2,369,536 | 2/1945 | Crandall | 28—49 |

LOUIS K. RIMRODT, Primary Examiner.